US006712998B2

(12) United States Patent
Kato

(10) Patent No.: US 6,712,998 B2
(45) Date of Patent: Mar. 30, 2004

(54) PROCESS FOR PRODUCING TRANSPARENT CONDUCTIVE LAYER FORMING COATING LIQUID

(75) Inventor: Kenji Kato, Chiba (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 10/281,161

(22) Filed: Oct. 28, 2002

(65) Prior Publication Data

US 2003/0085386 A1 May 8, 2003

(30) Foreign Application Priority Data

Nov. 2, 2001 (JP) ....................................... 2001-337413
Oct. 4, 2002 (JP) ....................................... 2002-292566

(51) Int. Cl.[7] ............................ C09D 1/00; C09D 5/24; H01B 1/22

(52) U.S. Cl. ....................... 252/514; 252/512; 106/1.19; 106/1.21; 106/1.28; 428/434; 423/22; 423/23

(58) Field of Search ................................ 252/514, 512; 428/403, 434; 106/1.19, 1.21, 1.28; 423/22, 23

(56) References Cited

U.S. PATENT DOCUMENTS

| | | | | | |
|---|---|---|---|---|---|
| 4,374,876 | A | * | 2/1983 | El-Shazly et al. | 427/443.1 |
| 5,273,828 | A | * | 12/1993 | Sato et al. | 428/432 |
| 5,476,688 | A | * | 12/1995 | Ostolski | 427/437 |
| 5,785,897 | A | | 7/1998 | Toufuku et al. | |
| 6,136,228 | A | * | 10/2000 | Hirai et al. | 252/512 |
| 6,261,479 | B1 | * | 7/2001 | Yukinobu et al. | 252/514 |
| 6,462,095 | B1 | * | 10/2002 | Bonsel et al. | 516/97 |

FOREIGN PATENT DOCUMENTS

| | | | | |
|---|---|---|---|---|
| EP | 0 649 160 A1 | | 4/1995 | |
| EP | 0 803 551 A2 | | 10/1997 | |
| EP | 0 911 859 A1 | | 4/1999 | |
| JP | 51-071227 | * | 6/1976 | C08J/7/04 |
| JP | 02-116611 | * | 5/1990 | 106/416 |
| JP | 8-77832 | | 3/1996 | |
| JP | 9-55175 | | 2/1997 | |
| JP | 9-286936 | | 11/1997 | |
| JP | 10-188681 | | 7/1998 | |
| JP | 10-204336 | | 8/1998 | |
| JP | 2000-268639 | | 9/2000 | |

OTHER PUBLICATIONS

Patent Abstracts of Japan Publication No. 09115438 dated May 2, 1997.

Patent Abstracts of Japan Publication No. 07282745 dated Oct. 27, 1995.

* cited by examiner

*Primary Examiner*—Yogendra N. Gupta
*Assistant Examiner*—Kallambella Vijayakumar
(74) *Attorney, Agent, or Firm*—Westerman Hattori Daniels & Adrian LLP

(57) ABSTRACT

A process produces a transparent conductive layer forming coating liquid by combining a colloidal dispersion of fine silver particles, a reducing agent and at least one of an alkali metal aurate solution and/or an alkali metal platinate solution to obtain a colloidal dispersion of noble-metal-coated fine silver particles coated with gold and/or platinum. A cation exchanger is added to the combination. The colloidal dispersion of noble-metal-coated fine silver particles is obtained while any impurity ions formed as a result of reduction are removed through the cation exchanger. This process enables the raw-material concentration to be set at a higher concentration than the conventional process to enable production of the transparent conductive layer forming coating liquid at a low cost and a good productivity.

11 Claims, No Drawings

PROCESS FOR PRODUCING TRANSPARENT CONDUCTIVE LAYER FORMING COATING LIQUID

BACKGROUND OF THE INVENTION

1. Field of the Invention

This invention relates to a process for producing a transparent conductive layer forming coating liquid (coating liquid for forming transparent conductive layers) which contains noble-metal-coated fine silver particles coated with gold or platinum alone or a composite of gold and platinum and are used for forming a transparent conductive layer on a transparent substrate. More particularly, it relates to a process for producing a transparent conductive layer forming coating liquid which can form a good transparent conductive layer providing a good reflection preventive effect and a good electric-field shielding effect and also having good transmitted-light profiles in the visible-light region and good weatherability when applied in front panels of display devices such as cathode ray tubes (CRT), plasma display panels (PDP), fluorescent display devices (VFD) and liquid-crystal display devices (LCD).

2. Description of the Related Art

With office automation (OA) made in recent years, a variety of OA instruments have been introduced into offices, and as office environment it has become no longer uncommon to do office works all day while facing display devices of OA instruments. Accordingly, in office works done sitting close to cathode ray tubes (CRTS; also called Braun tubes) of computers as an example of the OA instruments, it is required for display screens to be easy to watch and not to cause visual fatigue, as well as to be free from attraction of dust and electric shock which are due to the electrostatic charging on CRT surfaces.

Moreover, in addition to these, any ill influence on human bodies by low-frequency electromagnetic waves generated from CRTs is recently worried about, and it is desired for such electromagnetic waves not to leak outside. Such electromagnetic waves are generated from deflecting coils and flyback transformers and a large quantity of electromagnetic waves increasingly tend to leak to surroundings as televisions become larger in size.

Now, the leakage of magnetic fields can be prevented in its greater part by designing, e.g., by the changing of deflecting coils in shape. As for the leakage of electric fields, it can be prevented by forming a transparent conductive layer on the front-glass surface of a CRT.

Measures to prevent such leakage of electric fields are theoretically the same as the countermeasures taken in recent years to prevent electrostatic charging. However, the transparent conductive layer is required to have a much higher conductivity than any conductive layers formed for preventing the electrostatic charging. More specifically, a layer with a surface resistance of about $10^8$ Ω/square is considered sufficient for the purpose of preventing electrostatic charging. However, in order to prevent the leakage of electric fields (i.e., electric-field shielding), it is necessary to form at least a transparent conductive layer with a low resistance of $10^6$ Ω/square or less, preferably $5\times10^3$ Ω/square or less, and more preferably $10^3$ Ω/square or less.

Under such circumstances, as countermeasures for such a necessity, some proposals are made until now. In particular, as a method that can attain a low surface resistance at a low cost, a method is known in which a transparent conductive layer forming coating liquid prepared by dispersing conductive fine particles in a solvent together with an inorganic binder such as an alkyl-silicate is coated on a front glass for a CRT, followed by drying and then baking at a temperature of 200° C. or less.

This method making use of such a transparent conductive layer forming coating liquid is much simpler than any other transparent conductive layer forming methods employing vacuum evaporation (vacuum deposition), sputtering or the like, and can enjoy a low production cost. Thus, it is a method very advantageous as electric-field shielding that can be applied to CRTs.

As the transparent conductive layer forming coating liquid used in this method, a coating liquid is known in which indium tin oxide (ITO) is used as the conductive fine particles. Since, however, the resultant film has a surface resistance of as high as $10^4$ to $10^6$ Ω/square, a corrective circuit for cancelling electric fields is required in order to sufficiently shield the leaking electric fields. Hence, there has been a problem of a production cost which is rather high correspondingly. Meanwhile, in the case of a transparent conductive layer forming coating liquid making use of a metal powder as the conductive fine particles, the resultant film may have a little lower transmittance than in the case of the coating liquid making use of ITO, but a low-resistance film of from $10^2$ to $10^3$ Ω/square can be formed. Accordingly, such a coating liquid, which makes the corrective circuit unnecessary, is advantageous in cost and is considered to become prevailing in future.

Fine metal particles used in the above transparent conductive layer forming coating liquid are, as disclosed in Japanese Patent Applications Laid-open No. 8-77832 and No. 9-55175, limited to noble metals such as silver, gold, platinum, rhodium and palladium, which may hardly be oxidized in air. This is because, if fine particles of a metal other than noble metals as exemplified by iron, nickel or cobalt are used, oxide films are necessarily formed on the surfaces of such fine metal particles in the atmosphere, making it impossible to attain a good conductivity as the transparent conductive layer.

From another aspect, in order to make display screens easy to watch, anti-glare treatment is made to the surfaces of face panels so that the screens can be restrained from reflecting light. This anti-glare treatment can be made by a method in which a finely rough surface is provided to make diffused reflection on the surface greater. This method, however, can not be said to be preferable so much because its employment may bring about a low resolution, resulting in a low picture quality. Accordingly, it is preferable to make the anti-glare treatment by an interference method in which the refractive index and layer thickness of a transparent film is so controlled that the reflected light may rather interfere destructively with the incident light. In order to attain the effect of low reflection by such an interference method, it is common to employ a film of double-layer structure formed of a high-refractive-index film and a low-refractive-index film each having an optical layer thickness set at ¼ λ and ¼ λ, or ½ λ and ¼ λ, respectively (λ: wavelength). The film formed of fine particles of indium tin oxide (ITO) as mentioned above is also used as a high-refractive-index film of this type.

In metals, among parameters constituting an optical constants n-ik (n: refractive index; $i^2=-1$; k: extinction coefficient), the value of n is small but the value of k is extremely greater than that in ITO, and hence, also when the transparent conductive layer formed of fine metal particles is used, the effect of low reflection that is attributable to the interference of light can be attained by the double-layer structure as in the case of ITO (a high-refractive-index film).

Now, as stated above, fine metal particles used in the conventional transparent conductive layer forming coating liquid are limited to noble metals such as silver, gold, platinum, rhodium and palladium. To compare specific resistance of these, platinum, rhodium and palladium have a resistivity of 10.6, 5.1 and 10.8 $\mu\Omega\cdot$cm, respectively, which are higher than 1.62 and 2.2 $\mu\Omega\cdot$cm of silver and gold, respectively. Hence, it has been advantageous to use fine silver particles or fine gold particles in order to form a transparent conductive layer having a low surface resistance.

The use of fine silver particles, however, may cause a great deterioration due to sulfidation, oxidation or exposure to brine and ultraviolet rays to cause a problem on weatherability. On the other hand, the use of fine gold particles can eliminate the problem on weatherability but has had a problem on cost as in the case when fine platinum particles, fine rhodium particles or fine palladium particles are used. Moreover, the use of fine gold particles also has a problem that, because the transparent conductive layer formed absorbs a part of visible light rays in itself because of the optical properties inherent in gold, the film can not be used in the display surfaces of display devices such as CRTs where flat transmitted-light profiles are required over the whole region of visible light rays.

Under such technical background, the present inventor has already proposed a transparent conductive layer forming coating liquid which contains, in place of such fine silver or gold particles, noble-metal-coated fine silver particles surface-coated with gold or platinum alone or a composite of gold and platinum, and a process for producing the same (Japanese Patent Application Laid-open No. 2000-268639).

The surface-coating of fine silver particles with gold or platinum alone or a composite of gold and platinum enables achievement of weatherability and chemical resistance because the silver inside the noble-metal-coated fine silver particles is protected by the gold or platinum alone or the composite of gold and platinum.

Now, the transparent conductive layer forming coating liquid containing the noble-metal-coated fine silver particles is produced in the following way.

First, a colloidal dispersion of fine silver particles is made up by a known method [e.g., the Carey-Lea method, Am. J. Sci., 37, 47 (1889), Am. J. Sci., 38 (1889)]. More specifically, a mixed solution of an aqueous iron (II) sulfate solution and an aqueous sodium citrate solution are added to an aqueous silver nitrate solution to carry out reaction, and the resultant sediment is filtered and washed, followed by addition of pure water, whereby a colloidal dispersion of fine silver particles can be made up simply.

Next, to the colloidal dispersion of fine silver particles, thus obtained, a reducing agent such as hydrazine ($N_2H_4$), a borohydride such as sodium borohydride ($NaBH_4$), or formaldehyde, and at least one of an alkali metal aurate solution as exemplified by potassium aurate [$KAu(OH)_4$] solution and an alkali metal platinate solution as exemplified by potassium platinate [$K_2Pt(OH)_6$] solution are added, or the reducing agent and a solution of mixture of an alkali metal aurate and an alkali metal platinate are added, to coat the surfaces of fine silver particles with the gold or platinum alone or the composite of gold and platinum to obtain a colloidal dispersion of noble-metal-coated fine silver particles (a noble-metal-coated fine silver particle making step).

Here, in the above step of making noble-metal-coated fine silver particles, the reaction to coat the gold or platinum alone or composite of gold and platinum on the surfaces of fine silver particles takes place because minute and fine silver particles are already present in a large quantity in the solution at the time when gold or platinum is produced as a result of the reduction of an aurate or a platinate, and because the coating proceeds under conditions more advantageous in view of energy when gold or platinum grows on the surfaces of fine silver particles serving as nuclei than when gold or platinum makes nucleation (homogeneous nucleation) by itself. Thus, the presence of minute and fine silver particles in a large quantity in the solution is prerequisite at the time when gold or platinum is produced as a result of the reduction of an aurate or a platinate, and hence the timing at which the aurate solution or platinate solution, the aurate solution and platinate solution or the solution of mixture of the aurate and platinate and the reducing agent are added in the colloidal dispersion of fine silver particles in the step of making noble-metal-coated fine silver particles may preferably be so controlled that the reducing agent is added at least prior to adding the aurate solution or platinate solution, the aurate solution and platinate solution or the solution of mixture of an alkali metal aurate and an alkali metal platinate. More specifically, this is because, in the case when the reducing agent and the aurate solution or platinate solution, or the reducing agent and the aurate solution and platinate solution, or the reducing agent and the solution of mixture of the aurate and platinate are added in the colloidal dispersion of fine silver particles in the state they are mixed, the gold or platinum may be produced as a result of the reduction of the aurate or platinate and also the gold or platinum may make nucleation (homogeneous nucleation) by itself, at the stage where the aurate solution or platinate solution, the aurate solution and platinate solution or the solution of mixture of the aurate and platinate is mixed in the reducing agent, so that the reaction to coat the gold or platinum alone or composite of gold and platinum on the surfaces of fine silver particles may not take place even when the aurate solution and/or platinate solution or the like and the reducing agent are added to the colloidal dispersion of fine silver particles after they are mixed.

Next, the colloidal dispersion of noble-metal-coated fine silver particles thus obtained is subjected to desalting by dialysis, electrodialysis, ion exchange, ultrafiltration or the like, and then the colloidal dispersion of noble-metal-coated fine silver particles which has been subjected to desalting is concentrated to obtain a concentrated dispersion of noble-metal-coated fine silver particles (a desalting and concentrating step).

To this concentrated dispersion of noble-metal-coated fine silver particles, an organic solvent alone or an organic solvent containing an inorganic binder and so forth is further added to make component adjustment (a solvent-mixing step). Thus, the transparent conductive layer forming coating liquid is obtained.

Now, in the step of making noble-metal-coated fine silver particles, the noble-metal-coated fine silver particles obtained in the colloidal dispersion tend to agglomerate if the concentration of fine silver particles in the colloidal dispersion of fine silver particles and the concentration of the alkali metal aurate solution or the concentration of the alkali metal platinate solution are set at high values. Accordingly, the both are set to a low concentration.

However, where the raw-material concentration is set low in the step of making noble-metal-coated fine silver particles, the colloidal dispersion of noble-metal-coated fine silver particles thus obtained is made up in a large quantity, and hence a large-size reactor is required to bring about, correspondingly thereto, a problem of high production cost. Moreover, there is a difficulty in productivity that it takes a time when the colloidal dispersion is concentrated to a stated concentration in the desalting and concentrating step. The above conventional process has had such problems.

SUMMARY OF THE INVENTION

The present invention was made taking note of such problems. Accordingly, an object of the present invention is to provide a process for producing a transparent conductive layer forming coating liquid which process enables the raw-material concentration to be set at a higher concentration than the conventional process to enable achievement of the reduction of production cost and the improvement in productivity.

That is, the present invention provides a process for producing a transparent conductive layer forming coating liquid; the process comprising a noble-metal-coated fine silver particle making step of adding to a colloidal dispersion of fine silver particles i) a reducing agent and at least one of an alkali metal aurate solution and an alkali metal platinate solution or ii) a reducing agent and a solution of mixture of an alkali metal aurate and an alkali metal platinate to obtain a colloidal dispersion of noble-metal-coated fine silver particles the particle surfaces of which have been coated with gold or platinum alone or a composite of gold and platinum, wherein;

- a cation exchanger is added to the colloidal dispersion of fine silver particles before or after, or at the same time of, the addition of the reducing agent and any of the alkali metal aurate solution, the alkali metal platinate solution and the solution of mixture of an alkali metal aurate and an alkali metal platinate; and
- the colloidal dispersion of noble-metal-coated fine silver particles is obtained while any impurity ions formed as a result of reduction are removed through the cation exchanger.

DESCRIPTION OF THE PREFERRED EMBODIMENTS

The present invention is described below in detail.

First, the process for producing the transparent conductive layer forming coating liquid containing noble-metal-coated fine silver particles has as mentioned previously at least three-stage steps, i.e., the noble-metal-coated fine silver particle making step of obtaining a colloidal dispersion of noble-metal-coated fine silver particles, the desalting and concentrating step of subjecting the colloidal dispersion of noble-metal-coated fine silver particles thus obtained, to desalting and concentrating treatment to obtain a concentrated dispersion of noble-metal-coated fine silver particles, and the solvent-mixing step of adding to this concentrated dispersion of noble-metal-coated fine silver particles an organic solvent alone or an organic solvent containing an inorganic binder and so forth to make component adjustment.

In the noble-metal-coated fine silver particle making step, the concentration of the fine silver particles and that of the alkali metal aurate solution and an alkali metal platinate solution must be so determined as to be a concentration that does not cause any agglomeration of the noble-metal-coated fine silver particles obtained in the colloidal dispersion. It is commonly known that, the lower their concentration is, the more they may cause agglomeration with difficulty. However, if the both is set to a low concentration, the treating solution is made up in a large quantity, and hence the equipment for the step of coating the fine silver particles with a noble metal such as gold or platinum may inevitably be in a large scale. In the desalting and concentrating step, too, there is the problem that it takes a time until the colloidal dispersion is concentrated to a stated concentration, because of its low concentration, resulting in a low productivity.

To solve this problem, it may come to suffice if a colloidal dispersion containing the noble-metal-coated fine silver particles in a high concentration can be prepared. However, in the conventional production process, as stated previously the noble-metal-coated fine silver particles may inevitably agglomerate when the concentration of fine silver particles in the colloidal dispersion of fine silver particles and the concentration of the alkali metal aurate solution or the concentration of the alkali metal platinate solution are set at high values.

This is considered due to be as follows: When, e.g., an aurate of an alkali metal is reduced with, e.g., hydrazine, alkali metal ions and hydroxide ions are formed as shown in the following reaction scheme (1). Hence, an attempt to make the concentration of noble-metal-coated fine silver particles higher also inevitably makes the concentration of such impurity ions higher, so that the noble-metal-coated fine silver particles undergo agglomeration.

$$4MAu(OH)_4+3N_2H_4\rightarrow 4Au+4M^++4OH^-+12H_2O+3N_2 \quad (1)$$

M: alkali metal.

Accordingly, the present inventor has considered that the noble-metal-coated fine silver particles could be kept from agglomeration by removing as shown by the following reaction scheme (2) the impurity ions formed as a result of reduction, and has carried out the coating with the noble metal such as gold with addition of a substance having cation exchangeability, i.e., a cation exchanger ($H_n$-Exchanger: cation exchange resin and cation exchange clay, for example). As the result, the present inventor has discovered that the coating can thereby be carried out in a higher concentration than ever.

$$nM^++nOH^-+H_n\text{-Exchanger}\rightarrow nH_2O+Mn\text{-Exchanger} \quad (2)$$

More specifically, the transparent conductive layer forming coating liquid production process according to the present invention is characterized in that the cation exchanger is added to the colloidal dispersion of fine silver particles before or after, or at the same time of, the addition of the reducing agent and any of the alkali metal aurate solution, the alkali metal platinate solution and the solution of mixture of an alkali metal aurate and an alkali metal platinate, and a colloidal dispersion of noble-metal-coated fine silver particles is obtained while any impurity ions formed as a result of reduction are removed through the cation exchanger.

As the cation exchanger, there are no particular limitations thereon, and any substance may be used as long as it has cation exchangeability.

Here, the concentration of the noble-metal-coated fine silver particles obtained in the noble-metal-coated fine silver particle making step can be controlled to a higher concentration than in the conventional process. It may preferably be within the range of from 0.1 to 0.5% by weight, and more preferably from 0.15 to 0.3% by weight. If it is less than 0.1% by weight, the concentration is so low as not to be meaningfully superior to the conventional process. If on the other hand it is more than 0.5% by weight, where the noble-metal-coated fine silver particles are prepared under the same conditions as a case of a lower concentration than this, it may come difficult to well keep the particles from agglomerating even if the ion exchange is carried out. Also, this agglomeration of particles can be avoided by dropwise adding at a low rate the reducing agent and the alkali metal aurate solution, the alkali metal platinate solution or the solution of mixture of an alkali metal aurate and an alkali metal platinate. However, corresponding to the lowering of the rate of dropwise addition, it takes a longer time to prepare the noble-metal-coated fine silver particles, so that the effect of shortening the process time may a little lower. Hence, the concentration of the noble-metal-coated fine silver particles may preferably be within the range of 0.5% by weight or less.

Then, the colloidal dispersion in the noble-metal-coated fine silver particle making step may have a pH of from 3.5 to 11, and preferably from 5 to 9. This is because, if the colloidal dispersion has a pH of more than 11, the effect of ion exchange may not sufficiently be obtained, and if on the other hand it has a pH of less than 3.5, a phenomenon may occur such that the silver dissolves out in part.

The noble-metal-coated fine silver particles in the present invention may preferably have an average particle diameter of 100 nm or less. This is because those having an average particle diameter of more than 100 nm make it necessary to use solid matter in a large quantity in order to ensure the number of noble-metal-coated fine silver particles that is necessary when conducting paths are formed using this coating liquid, so that the transparent conductive layer may inevitably have a low visible-light transmittance. This is also because, supposing that the layer thickness of the transparent conductive layer is set small to enhance the visible-light transmittance, the conductive layer may inevitably has too high surface resistance to be feasible for practical use. As the lower limit, the present noble-metal-coated fine silver particles may preferably have an average particle diameter of 1 nm or more. Those having an average particle diameter of less than 1 nm may be produced as the fine particles with difficulty, and also such particles tend to agglomerate in the coating liquid and are impractical. The average particle diameter herein termed refers to average particle diameter of fine particles observed on a transmission electron microscope (TEM).

The colloidal dispersion of noble-metal-coated fine silver particles thus obtained may thereafter preferably be subjected to desalting by dialysis, electrodialysis, ion exchange, ultrafiltration or the like as in the conventional production process, to lower electrolyte concentration in the colloidal dispersion.

Next, the colloidal dispersion of noble-metal-coated fine silver particles which has been subjected to desalting is concentrated by means of a reduced-pressure evaporator or by ultrafiltration to obtain a concentrated dispersion of noble-metal-coated fine silver particles. To this concentrated dispersion, an organic solvent alone or an organic solvent containing an inorganic binder is added to make component adjustment (fine-particle concentration, water concentration and so forth). Thus, the transparent conductive layer forming coating liquid according to the present invention is obtained.

There are no particular limitations on the organic solvent, which may appropriately be selected depending on coating methods and film-forming conditions. It may include, but not limited to, e.g., alcohol type solvents such as methanol, ethanol (EA), isopropanol, butanol, benzyl alcohol and diacetone alcohol (DAA); ketone type solvents such as acetone, methyl ethyl ketone (MEK), methyl isobutyl ketone (MIBK), cyclohexanone and isophorone; glycol derivatives such as propylene glycol methyl ether and propylene glycol ethyl ether; as well as formamide (FA), N-methylformamide, dimethylformamide (DMF), dimethylacetamide, dimethyl sulfoxide (DMSO) and N-methyl-2-pyrrolidone (NMP).

Using the transparent conductive layer forming coating liquid according to the present invention thus obtained, a transparent double-layer film may be obtained which is constituted of a transparent substrate and formed thereon a transparent conductive layer composed chiefly of i) noble-metal-coated fine silver particles and ii) a binder matrix and a transparent coat layer further formed thereon.

To form the transparent double-layer on the transparent substrate, it may be done by a method described below. That is, the transparent conductive layer forming coating liquid according to the present invention, composed chiefly of the solvent and the noble-metal-coated fine silver particles, is coated on the transparent substrate, such as a glass substrate or a plastic substrate, by a coating process such as spray coating, spin coating, wire bar coating or doctor blade coating, optionally followed by drying. Thereafter, a transparent coat layer forming coating liquid composed chiefly of, e,g, silica sol is over-coated (top-coated) by the same coating process as the above.

Next, after the overcoating, the coating formed is heated at a temperature of about, e.g., 50 to 250° C. to cause the over-coated transparent coat layer to cure, thus the transparent double-layer films are formed to obtain a conductive layered structure.

Thus, according to the transparent conductive layer forming coating liquid production process of the present invention, in the noble-metal-coated fine silver particle making step, the cation exchanger is added to the colloidal dispersion of fine silver particles before or after, or at the same time of, the addition of the reducing agent and any of the alkali metal aurate solution, the alkali metal platinate solution and the solution of mixture of an alkali metal aurate and an alkali metal platinate, and the colloidal dispersion of noble-metal-coated fine silver particles is obtained while any impurity ions such as alkali metal ions formed as a result of reduction are removed through the cation exchanger.

Accordingly, since the impurity ions causative of the agglomeration of noble-metal-coated fine silver particles in the colloidal dispersion are removed, a higher concentration can be set in respect of the raw-material concentration than that in the conventional process. Hence, the present process has the effect that the transparent conductive layer forming coating liquid in which the noble-metal-coated fine silver particles are contained can be produced at a low cost and in a good productivity.

In addition, the conductive layered structure having the transparent conductive layer formed using the transparent conductive layer forming coating liquid according to the present invention has a high strength and a high transmittance and has superior weatherability and ultraviolet-light resistance. It also has a superior reflection preventive effect and a flat transmitted-light profile and has a high electric-field shielding effect. Hence, it can be used in front panels of display devices such as cathode ray tubes (CRT), plasma display panels (PDP), fluorescent display devices (VFD), field emission display (FED) devices, electroluminescence display (ELD) devices and liquid-crystal display (LCD) devices.

The present invention is described below in greater detail by giving Examples. The present invention is by no means limited to these Examples. In the following, "%" refers to "% by weight" except for "%" of transmittance, reflectance and haze, and "part(s)" refers to "part(s) by weight".

EXAMPLE 1

A colloidal dispersion of noble-metal-coated fine silver particles was prepared in the manner described previously.

First, as a silver colloid, it was made up by a method commonly known as the Carey-Lea process. Stated specifically, to 33 g of an aqueous 9% silver nitrate solution, a mixture of 39 g of an aqueous 23% iron (II) sulfate solution and 48 g of an aqueous 37.5% sodium citrate solution was added, and the sediment formed was filtered and washed, followed by addition of pure water to make up a colloidal dispersion of fine silver particles (silver concentrating: 0.16%).

This colloidal dispersion of fine silver particles was weighed in an amount of 67.5 g, and 5 g of a cation-exchange resin (available from Mitsubishi Chemical Corporation; trade name: DIAION SKNUPB) was added thereto. Thereafter, a solution prepared by adding 0.13 g of an aqueous 1% polymeric dispersant solution to 144 g of an aqueous potassium aurate [$KAu(OH_4)$] solution (Au: 0.3%) and 144.13 g of an aqueous 0.063% hydrazine monohydrate ($N_2H_4.H_2O$) solution were each dropwise added to obtain a colloidal dispersion of noble-metal-coated fine silver particles with a concentration of 0.15%. The pH of the colloidal dispersion in the noble-metal-coated fine silver particles making step was 5 to 7.

To the colloidal dispersion of noble-metal-coated fine silver particles thus obtained, an amphoteric ion-exchange resin (available from Mitsubishi Chemical Industries Limited; trade name: DIAION SMNUPB) was added to effect desalting, followed by ultrafiltration to make concentrating treatment. The time taken for the concentrating treatment was about 50 minutes. To the resultant concentrated liquid, various solvents (shown below) were added to obtain a transparent conductive layer forming coating liquid according to Example 1 (Ag: 0.08%; Au: 0.32%; water: 10.7%; EA: 53.6%; DAA: 10.0%; PGM: 25.0%; FA:0.1%). Incidentally, EA stands for ethanol; DAA, diacetone alcohol; PGM, propylene glycol monomethyl ether; and FA, formamide.

This transparent conductive layer forming coating liquid was observed on a transmission electron microscope to reveal that the noble-metal-coated fine silver particles had an average particle diameter of 7.0 nm.

Next, the transparent conductive layer forming coating liquid according to Example 1 was spin-coated (150 rpm, for 90 seconds) on a glass substrate (soda-lime glass of 3 mm thick) heated to 40° C., and thereafter subsequently a silica sol was spin-coated thereon (150 rpm, for 60 seconds), followed by curing at 200° C. for 20 minutes to obtain a glass substrate provided with a transparent double-layer film constituted of a transparent conductive layer containing the noble-metal-coated fine silver particles and a transparent coat layer formed of a silicate film composed chiefly of silicon oxide, i.e., a transparent conductive layered structure according to Example 1.

Here, the above silica sol was made up using 19.6 parts of Methyl-silicate 51 (trade name; available from Colcoat Co., Ltd.), 57.8 parts of ethanol, 7.9 parts of an aqueous 1% nitric acid solution and 14.7 parts of pure water to obtain one having $SiO_2$ (silicon oxide) solid content in a concentration of 10% and a weight-average molecular weight of 2,850, which was finally diluted with a mixture of isopropyl alcohol (IPA) and n-butanol (NBA) (IPA/NBA=3/1) so as to have the $SiO_2$ solid content in a concentration of 0.8%.

Film characteristics (surface resistance, visible light ray transmittance, haze, and bottom reflectance/bottom wavelength) examined on the transparent double-layer film formed on the glass substrate are shown in Table 1 below. Here, the bottom reflectance is meant to be a minimum reflectance in the reflection profile of the transparent conductive layered structure, and the bottom wavelength a wavelength at the minimum reflectance.

Transmittance shown in Table 1 in respect of only the transparent double-layer film, excluding the transparent substrate (glass substrate), in a wavelength region (380 to 780 nm) of visible light rays is determined in the following way:

Transmittance (%) of only transparent double-layer film, excluding transparent substrate (glass substrate)=[(transmittance measured inclusive of transparent substrate)/(transmittance of transparent substrate)]×100

Here, in the present specification, unless particularly noted, transmittance of the part excluding the transparent substrate (i.e. transmittance of the transparent double-layer film) is used as the transmittance.

The surface resistance of the transparent double-layer film is measured with a surface resistance meter LORESTA AP (MCP-T4000), manufactured by Mitsubishi Chemical Industries Limited. The value of haze and the visible light ray transmittance are measured with a haze meter (HR-200) manufactured by Murakami Color Research Laboratory, on the whole layered structure inclusive of the transparent substrate. The reflectance is measured with a spectrophotometer (U-400) manufactured by Hitachi Ltd. The particle diameter of the noble-metal-coated fine silver particles is measured by observing the particles on a transmission electron microscope manufactured by JEOL Ltd.

EXAMPLE 2

A colloidal dispersion of fine silver particles (silver: 0.16%) which was made up in the same manner as in Example 1 was weighed in an amount of 67.5 g, and 3 g of the cation-exchange resin was added thereto. Thereafter, a solution prepared by adding 0.13 g of an aqueous 1% polymeric dispersant solution to 86.4 g of an aqueous potassium aurate [$KAu(OH_4)$] solution (Au: 0.5%) and 86.53 g of an aqueous 0.10% hydrazine monohydrate ($N_2H_4.H_2O$) solution were each dropwise added to obtain a colloidal dispersion of noble-metal-coated fine silver particles with a concentration of 0.22%. The pH of the colloidal dispersion in the noble-metal-coated fine silver particles making step was 7 to 9.

The colloidal dispersion of noble-metal-coated fine silver particles thus obtained was treated in the same manner as in Example 1 to obtain a transparent conductive layer forming coating liquid according to Example 2 (Ag: 0.08%; Au: 0.32%; water: 9.7%; EA: 54.5%; DAA: 10.0%; PGM: 25.0%; FA:0.1%). Here, the time taken for the concentrating treatment was about 35 minutes.

This transparent conductive layer forming coating liquid was observed on a transmission electron microscope to reveal that the noble-metal-coated fine silver particles had an average particle diameter of 7.5 nm.

Film characteristics examined on the transparent double-layer film formed on the glass substrate are shown in Table 1.

EXAMPLE 3

A colloidal dispersion with a fine-silver-particle concentration of 0.3% was made up in the same manner as in Example 1, which was then weighed in an amount of 36 g, and 5 g of the cation-exchange resin was added thereto. Thereafter, a solution prepared by adding 0.13 g of an aqueous 1% polymeric dispersant solution to 43.2 g of an aqueous potassium aurate [$KAu(OH_4)$] solution (Au: 1.0%) and 43.33 g of an aqueous 0.21% hydrazine monohydrate ($N_2H_4.H_2O$) solution were each dropwise added to obtain a colloidal dispersion of noble-metal-coated fine silver particles with a concentration of 0.44%. The pH of the colloidal dispersion in the noble-metal-coated fine silver particles making step was 4 to 6.

The colloidal dispersion of noble-metal-coated fine silver particles thus obtained was treated in the same manner as in Example 1 to obtain a transparent conductive layer forming coating liquid according to Example 3 (Ag: 0.08%; Au: 0.32%; water: 10.2%; EA: 54.0%; DAA: 10.0%; PGM: 25.0%; FA: 0.1%). Here, the time taken for the concentrating treatment was about 20 minutes.

This transparent conductive layer forming coating liquid was observed on a transmission electron microscope to reveal that the noble-metal-coated fine silver particles had an average particle diameter of 8.5 nm.

Film characteristics examined on the transparent double-layer film formed on the glass substrate are shown in Table 1.

EXAMPLE 4

A colloidal dispersion of fine silver particles (silver: 0.3%) which was made up in the same manner as in Example 3 was weighed in an amount of 36 g, and a solution prepared by adding 0.13 g of an aqueous 1% polymeric dispersant solution to 28.8 g of an aqueous potassium aurate [$KAu(OH_4)$] solution (Au: 1.5%) and 28.93 g of an aqueous 0.31% hydrazine monohydrate ($N_2H_4.H_2O$) solution were each dropwise added at a dropping rate lower than that in other Examples and also the cation-exchange resin was little by little added to obtain a colloidal dispersion of noble-metal-coated fine silver particles with a concentration of 0.58%. Here, the pH of the colloidal dispersion in the noble-metal-coated fine silver particles making step was 4 to 6.

The colloidal dispersion of noble-metal-coated fine silver particles thus obtained was treated in the same manner as in Example 1 to obtain a transparent conductive layer forming coating liquid according to Example 4 (Ag: 0.08%; Au: 0.32%; water: 10.4%; EA: 53.8%; DAA: 10.0%; PGM: 25.0%; FA:0.1%). Here, the time taken for the concentrating treatment was about 15 minutes.

This transparent conductive layer forming coating liquid was observed on a transmission electron microscope to reveal that the noble-metal-coated fine silver particles had an average particle diameter of 8.8 nm.

Film characteristics examined on the transparent double-layer film formed on the glass substrate are shown in Table 1.

COMPARATIVE EXAMPLE 1

A colloidal dispersion with a fine-silver-particle concentration of 0.1% was made up in the same manner as in Example 1, which was then weighed in an amount of 108 g, and a solution prepared by adding 0.1 g of an aqueous 1% polymeric dispersant solution to 288 g of an aqueous potassium aurate [$KAu(OH_4)$] solution (Au: 0.15%) and 288.1 g of an aqueous 0.031% hydrazine monohydrate ($N_2H_4.H_2O$) solution were each dropwise added to obtain a colloidal dispersion of noble-metal-coated fine silver particles with a concentration of 0.079%. The pH of the colloidal dispersion in the noble-metal-coated fine silver particles making step was 11.5 to 13.

The colloidal dispersion of noble-metal-coated fine silver particles thus obtained was desalted with a cation-exchange resin and an amphoteric ion-exchange resin, and the subsequent procedure in Example 1 was repeated to obtain a transparent conductive layer forming coating liquid according to Comparative Example 1 (Ag: 0.08%; Au: 0.32%; water: 10.5%; EA: 53.5%; DAA: 10.0%; PGM: 25.0%; FA:0.1%). Here, the time taken for the concentrating treatment was about 100 minutes.

This transparent conductive layer forming coating liquid was observed on a transmission electron microscope to reveal that the noble-metal-coated fine silver particles had an average particle diameter of 7.2 nm.

Film characteristics examined on the transparent double-layer film formed on the glass substrate are shown in Table 1.

COMPARATIVE EXAMPLE 2

A colloidal dispersion of noble-metal-coated fine silver particles was prepared in the same manner as in Example 2 except that the cation-exchange resin was not added, to obtain a colloidal dispersion of noble-metal-coated fine silver particles with a concentration of 0.22%. The pH of the colloidal dispersion in the noble-metal-coated fine silver particles making step was 12 to 13.5, and the gold-coated fine silver particles agglomerated.

TABLE 1

| | Concentration of noble = metal-coated fine silver particles in dispersion (%) | Dispersion pH in the step of preparing dispersion | Concentrating treatment time (min.) | Surface resistance (Ω/square) | Visible = light trans-mittance (%) | Haze value (%) | Bottom reflectance/ bottom wavelength (%)/(nm) |
|---|---|---|---|---|---|---|---|
| Example: | | | | | | | |
| 1 | 0.15 | 5~6 | 50 | 264 | 82.0 | 0.1 | 0.12/515 |
| 2 | 0.22 | 7~6 | 35 | 291 | 81.7 | 0.1 | 0.15/520 |
| 3 | 0.44 | 4~6 | 20 | 601 | 80.3 | 0.1 | 0.14/515 |
| 4 | 0.58 | 4~6 | 15 | 649 | 80.5 | 0.1 | 0.14/520 |
| Comparative Example: | | | | | | | |
| 1 | 0.079 | 11.5~43 | 100 | 278 | 81.3 | 0.1 | 0.10/540 |
| 2 | 0.22 | 12~43.5 | — | — | — | — | — |

Evaluation:

As can be seen from the results shown in Table 1, the time for concentrating treatment has sharply been shortened in all Examples than in Comparative Example 1, in which the ion exchange is not effected.

The surface resistance of the transparent conductive layers is on the level of $10^2$ Ω/square in all Examples, and is confirmed to be sufficiently low resistance. In Comparative Example 2, it has been confirmed that the use of raw materials with a higher concentration (a colloidal dispersion with a fine-silver-particle concentration of 0.16% and an aqueous potassium aurate solution with 0.5% of Au) than those in Comparative Example 1 and without being subjected to any ion exchange has resulted in agglomeration of the noble-metal-coated fine silver particles, so that any colloidal dispersion of noble-metal-coated fine silver particles can not be prepared.

In all Example and Comparative Example, noble-metal-coated fine silver particles are made using gold as the noble metal. Examples making use of platinum have also been worked, and have been confirmed to show the same tendency as the cases making use of gold.

What is claimed is:

1. A process for producing a transparent conductive layer forming coating liquid; the process comprising a noble-metal-coated fine silver particle making step of adding to a colloidal dispersion of fine silver particles i) a reducing agent and at least one of an alkali metal aurate solution and an alkali metal platinate solution or ii) a reducing agent and a solution of mixture of an alkali metal aurate and an alkali metal platinate to obtain a colloidal dispersion of noble-metal-coated fine silver particles the particle surfaces of which have been coated with gold or platinum alone or a composite of gold and platinum, wherein;

a cation exchanger is added to said colloidal dispersion of fine silver particles before, or at the same time of, the addition of said reducing agent and any of said alkali metal aurate solution, said alkali metal platinate solution and said solution of mixture of an alkali metal aurate and an alkali metal platinate; and said colloidal dispersion of noble-metal-coated fine silver particles is obtained while any impurity ions formed as a result of reduction are removed through the cation exchanger.

2. The process according to claim 1, wherein, in said colloidal dispersion of noble-metal-coated fine silver particles obtained in said noble-metal-coated fine silver particles making step, the noble-metal-coated fine silver particles are controlled to a concentration within the range of from 0.1% by weight to 0.5% by weight.

3. The process according to claim 1, wherein said colloidal dispersion in said noble-metal-coated fine silver particles making step has a pH of from 3.5 to 11.

4. The process according to claim 1, wherein said colloidal dispersion in said noble-metal-coated fine silver particles making step has a pH of from 5 to 9.

5. The process according to any one of claims 1 to 4, wherein said cation exchanger in said noble-metal-coated fine silver particles making step is a cation-exchange resin or a cation-exchange clay.

6. The process according to any one of claims 1 to 4, wherein said noble-metal-coated fine silver particles have an average particle diameter of 100 nm or less.

7. The process according to claim 5, wherein said noble-metal-coated fine silver particles have an average particle diameter of 100 nm or less.

8. The process according to any one of claims 1 to 4, wherein said noble-metal-coated fine silver particles are gold-coated fine silver particles.

9. The process according to claim 5, wherein said noble-metal-coated fine silver particles are gold-coated fine silver particles.

10. The process according to claim 6, wherein said noble-metal-coated fine silver particles are gold-coated fine silver particles.

11. The process according to claim 7, wherein said noble-metal-coated fine silver particles are gold-coated fine silver particles.

* * * * *

UNITED STATES PATENT AND TRADEMARK OFFICE

CERTIFICATE OF CORRECTION

PATENT NO. : 6,712,998 B2
DATED : March 30, 2004
INVENTOR(S) : Kenji Kato

It is certified that error appears in the above-identified patent and that said Letters Patent is hereby corrected as shown below:

Column 9,
Line 21, please change "[KAu($OH_4$)]" to -- [KAu$(OH)_4$] --

Column 10,
Line 24, please change "MCP-T4000" to -- MCP-T400 --
Line 30, please change "U-400" to -- U-4000 --
Line 42, please change "[KAu($OH_4$)]" to -- [KAu$(OH)_4$] --

Column 11,
Lines 5 and 32-33, please change "[KAu($OH_4$)]" to -- [KAu$(OH)_4$] --

Column 12,
Line 15, please change "[KAu($OH_4$)]" to -- [KAu$(OH)_4$] --

Column 11 and 12,
Table 1, "Dispersion pH in the step of preparing dispersion" please change "7~6" to -- 7~9 --; and please change "11.5~43" to -- 11.5~13 --; and please change "12~43.5" to -- 12~13.5 --.
Table 1, "Example 2" please change "7~6" to -- 7~9 --; and please change "11.5~43" to -- 11.5~13 --; and please change "12~43.5" to -- 12~13.5 --.

Signed and Sealed this

Fourteenth Day of September, 2004

JON W. DUDAS
*Director of the United States Patent and Trademark Office*